RADIX CONVERTING EXHIBITOR

Filed June 21, 1954 2 Sheets-Sheet 1

INVENTORS.
WESLEY A. HOLMAN
REYNOLD B. JOHNSON
BY John B. Aponsler
AGENT

RADIX CONVERTING EXHIBITOR

Filed June 21, 1954

INVENTORS.
WESLEY A. HOLMAN
REYNOLD B. JOHNSON
BY John B. Sponsler
AGENT

United States Patent Office 2,745,093

Patented May 8, 1956

2,745,093

RADIX CONVERTING EXHIBITOR

Wesley A. Holman, Santa Clara County, and Reynold B. Johnson, Palo Alto, Calif., assignors to International Business Machines Corporation, New York, N. Y., a corporation of New York Application June 21, 1954, Serial No. 438,273

9 Claims. (Cl. 340—332)

The present invention relates to a device for registering values corresponding to binary information. This invention relates more specifically to a novel device for registering decimal or other data directly from binary information by employing certain photoelectric units within a matrix.

Present methods of translating from a binary code to energize lines for the direct registration of decimal or other notations require an extensive matrix of many crystal diodes and electron tubes or require the extensive use of relays or other electromechanical devices. When relays or other electromechanical devices are used the speed of translation is materially limited.

An object of this invention is to provide a device for this translation which operates by photoelectric means.

A further object is to provide a register using a photoelectric device to effect a translation from a binary notation to a decimal notation registration.

Another object of this invention is to provide a novel photoelectric cell arranged wherein two conditions of conductivity may be selectively obtained.

A still further object of the invention is to provide a novel circuit of photosensitive units, each unit of which operates selectively within the circuit in response to light excitation.

Still another object is to provide a novel register of simple and economical construction.

Other objects of the invention will be pointed out in the following description and claims and illustrated in the accompanying drawings which disclose, by way of example, the principle of the invention and the best mode which has been contemplated by applying that principle.

Figures 1, 3:
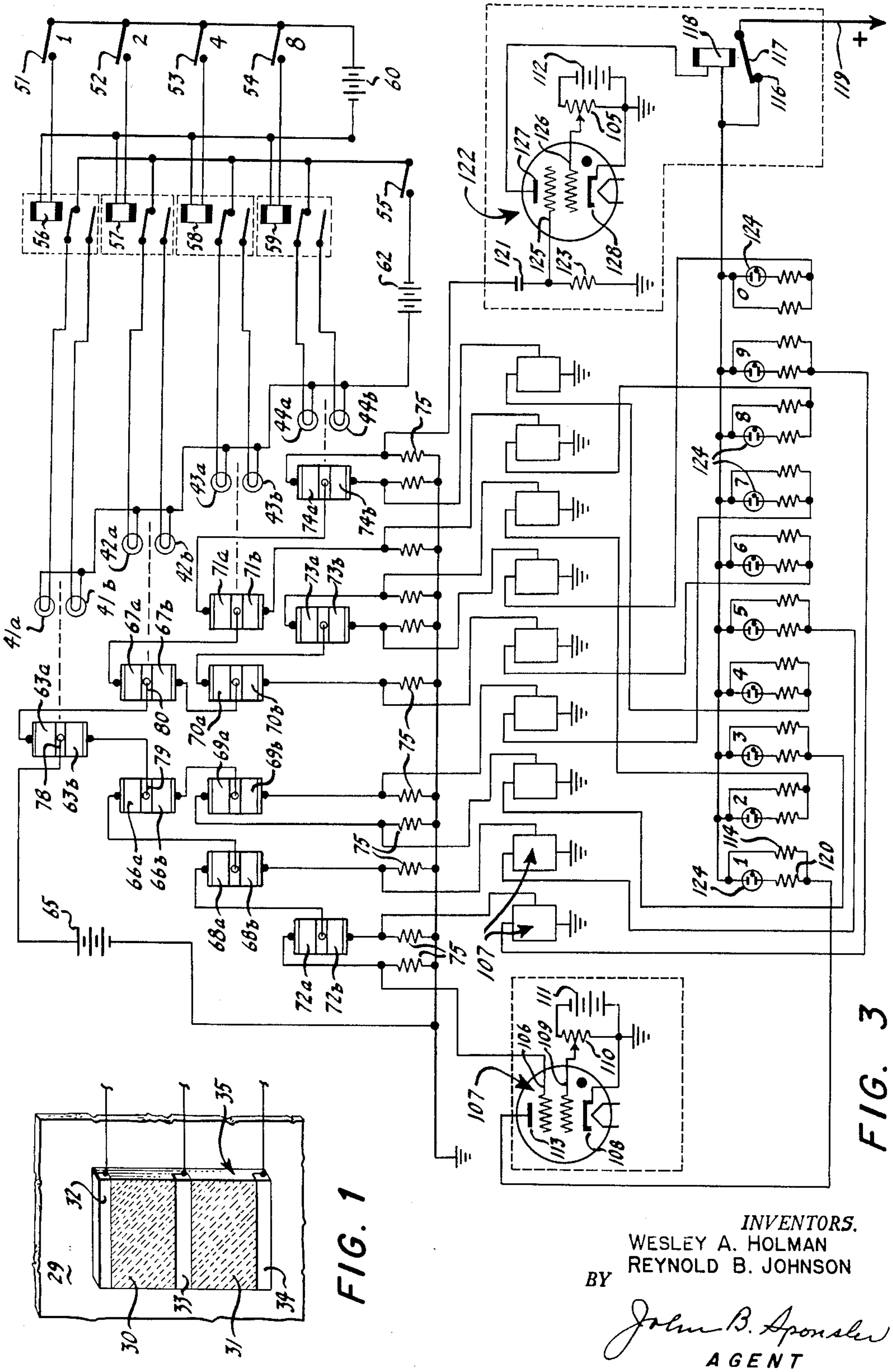
Fig. 1 is a diagrammatic view of a single photoelectric unit.
Fig. 3 is a wiring diagram adapted to the construction shown in Fig. 1 including the electrical circuit connections.

Referring to Fig. 1, a porcelain plate 29 is provided upon which is affixed a photosensitive unit 35. The unit 35 is formed by coating a portion of the porcelain plate 29 with a rectangular layer of a photosensitive material such as selenium or lead sulphide. An electrode 32 is attached at one end of the rectangle and an electrode 34 is attached to the opposite end. A third electrode 33 is attached to the rectangle to bisect the photosensitive material directly between electrodes 32 and 34 to form two independent photosensitive cells 30 and 31 with the electrode 33 being common to both cells. The electrodes 32, 33, and 34 may be made of any suitable highly conductive material such as silver or copper. The unit 35 may be employed to function substantially similar to a single pole double throw switch by employing a light source (not shown) which will selectively shine on either cell 30 or 31. Consequently, the resistance between electrodes 32 and 33 is relatively low when cell 30 is illuminated as compared with its normal resistance, and the cell 31 is similarly affected so that when light shines only on cell 30 a substantial current may flow between terminals 32 and 33 that would not flow between terminals 33 and 34 unless cell 31 was similarly illuminated.

Figure 2:
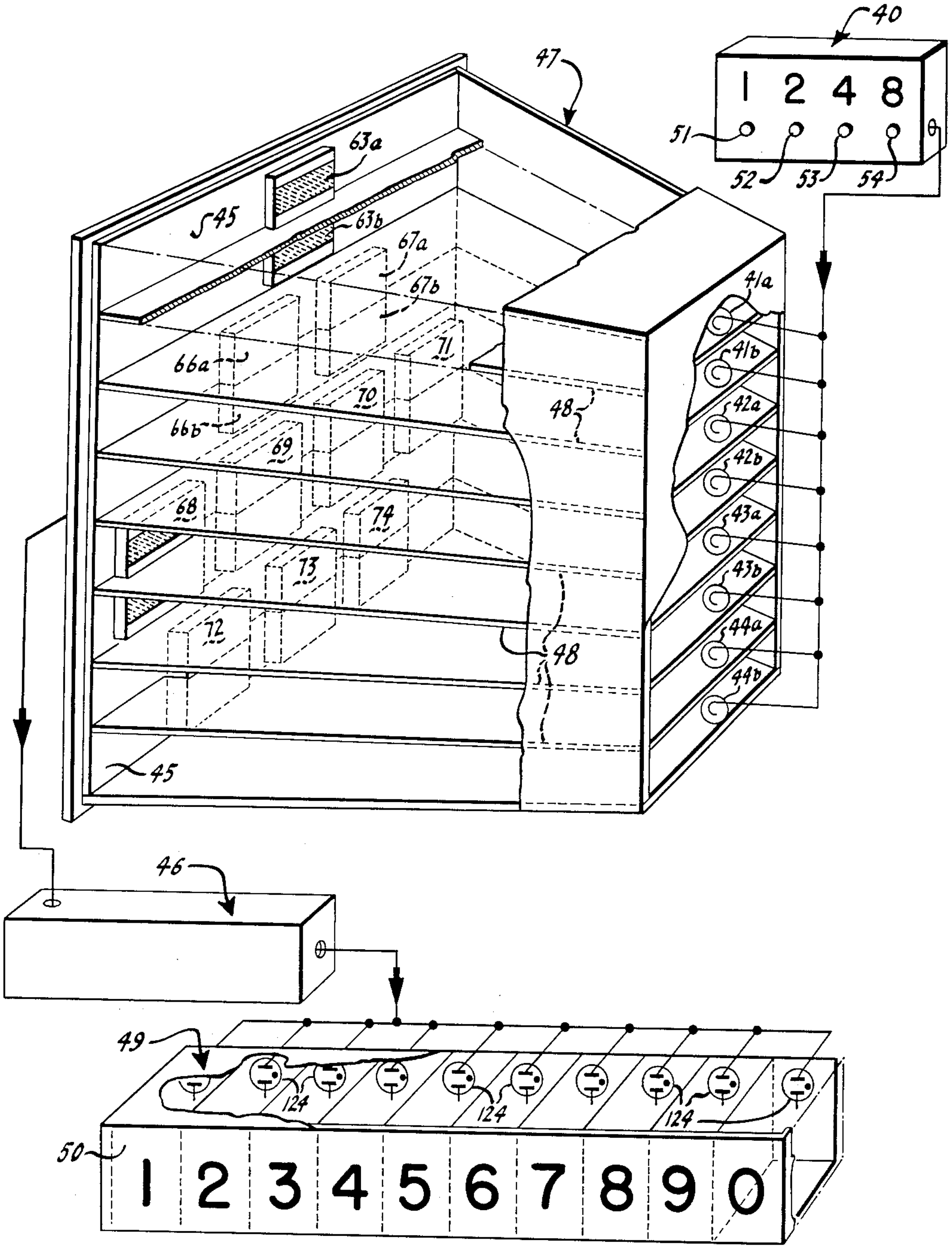
Fig. 2 is a diagrammatic view of a matrix of photoelectric units arranged in compartments within a light sealed container together with light sources for selectively enregizing the units.

In Fig. 2 a target surface 45 is provided on which are affixed 10 two-celled photosensitive units 35. One such unit 63 is placed on the upper portion of the target surface 45 and two units 66 and 67 are placed in a parallel bank under unit 63. Four units 68, 69, 70, and 71 are placed in a similar parallel bank below units 66 and 67, and three units 72, 73, and 74 are placed in another similar parallel bank on the bottom area of the target surface 45 under units 68, 69, 70, and 71. A light-tight container 47 is provided to enclose the target surface 45. The container 47 has parallel partitions 48 arranged therein to divide the target surface 45 into 8 light-proof sections that function to separate each bank of units and also separate the 2 cells of every unit. A light source is provided for the cells in each section so that a light source 41A will coact with a cell 63A and a light source 41B will coact with a cell 63B. Similarly, a light source 42A is arranged with cells 66A and 67A while a light source 42B is similarly arranged with cells 66B and 67B. Likewise, cells 68A, 69A, 70A, and 71A are illuminated by light source 43A and cells 68B, 69B, 70B, and 71B by a light source 43B. A light source 44A is arranged to coact with cells 72A, 73A, and 74A; and a light source 44B is arranged to coact with cells 72B, 73B, and 74B.

A terminal box 46 (see Fig. 2), the circuit of which is described below in detail in connection with Fig. 3, is arranged for the photocells to control 10 neon bulbs 124. Each neon bulb 124 is a container 49 behind a glass panel 50 with numbers from "1" to "9" and "zero" etched therein so that each neon bulb 124, when energized, will cause one number on the panel to be illuminated.

A key register 40, also described in detail below, has four switches 51, 52, 53, and 54 to receive information representative of binary lines for units "1," "2," "4," and "8." The presence or absence of binary units is expressed by the condition of the switches so that an input of a binary unit "one" is represented by closing switch 51, a "two" by closing switch 52, a "four" by switch 53, and an "eight" by closing switch 54.

Referring to Fig. 3, the key register 40 of Fig. 2 has four relays 56, 57, 58, and 59, a power source 60 and the four switches 51, 52, 53, and 54 for the relays, and a power source 62 and a switch 55 for the lights 41A through 44B. Switch 51 is arranged to control light 41A and 41B through relay 56. Normally light 41A is lit; however, when switch 51 is closed relay 56 is energized which causes light 41A to be extinguished and light 41B to light. Light source 42A and 42B are similarly controlled by switch 52 through relay 57 to have light 42A normally illuminated. With switch 52 closed, light 42B is illuminated and light 42A is not. Light sources 43A and 43B are similarly controlled by switch 53 and relay 58 and lights 44A and 44B by relay 59 and switch 54, so that normally lights 43A and 44A are lit. When a switch 53 is closed, light 43A is extinguished and light 43B is lit, and when switch 54 is closed light 44A is extinguished and light 44B is lit.

The circuits for the 10 units on target surface 45 have a power source 65 connected to a common terminal 78 of unit 63, one cell 63A of unit 63 connects to a common terminal 80 of unit 67 and the other cell 63B connects to the common terminal 79 of unit 66. Cells 66A, 66B, 67A, and 67B connect to common terminals of units 68, 69, 70, and 71, respectively, and the cells 68A, 70A, 71A connect to the common terminals of units 72, 73, and 74. Cells 72A, 72B, 68B, 69A, 69B, 70B, 73A, 73B, 71B, 74A, and 74B each connect through a load resistor 75 to the power supply 65. The 10 units thus contain 11 conductive paths through the cells and the power supply 65. The amount of current flowing in each photocell path is determined by the amount of light each cell within the path receives.

The circuit of terminal box 46 of Fig. 2 is arranged to sense the current flow of each photocell path. Each path, except the path terminating with cell 74A, has a thyratron 107 which fires only when each and every cell in the path is exposed to light. In order to sense the current level for this condition and fire, a grid 106 of each thyratron 107 connects between a load resistor 75 and its connecting cell. A second grid 109 connects through a variable grid bias resistor 110 and a power supply 111 to a ground and to a cathode 108. The bias for all thyratrons 107 is adjusted by resistor 110. A plate 113 connects to a plate load resistor 114 in parallel with a neon bulb 124 and a resistor 120 through relay contact points 116 and 117 to the positive side of power source 119, the negative side of which is connected to ground.

When a thyratron 107 fires, the neon bulb 124 will light and remains lit until the thyratron is reset by an interruption of the thyratron's plate voltage. This is usually accomplished by opening the contact points 116 and 117 as hereinafter described. Each of the 10 neon bulbs 124 are located in a compartment of box 49 behind the plate 50. The arrangement of the bulbs 124 is such that one thyratron 107 is connected to the photocell path terminated by cell 72 and will illuminate a neon bulb 124 which is behind a numeral "1" when fired, and another thyratron 107 connects to the photocell path terminated by cell 73A and a neon bulb 124 behind a numeral "2" on plate 50. Similarly, another thyratron 107 connects with cell 69A and will illuminate a numeral "3." A thyratron 107 for cell 74B will illuminate a numeral "4," a thyratron 107 for cell 68B, numeral "5"; a thyratron 107 for cell 70B, a numeral "6"; for cell 69B, numeral "7"; cell 71B, numeral "8"; cell 72B, numeral "9"; and a thyratron for cell 73B will illuminate a numeral "0."

The decimal equivalent of a binary number value represented by the condition of switches 51, 52, 53, and 54 is registered on the display panel 50 in its decimal form by the lights 124. For example, if switch 52 and 53, representing binary "2" and "4" are closed, lights 41A, 42B, 43B, and 44A will be lit and the only path of completely lighted photocells will be through photocells 63A, 67B, and 70B which causes the thyratron 107 connecting to the photocell path terminating with photocell 70B to fire, and the neon bulb 124 behind the numeral "6" is illuminated.

A thyratron 122 is connected to the photocell path terminating with cell 74A to reset all the thyratrons 107 which are conducting. A condenser 121 capacitively couples cell 74A to the grid 125 and a grounded resistor 123. A second grid 126 connects through a variable grid bias resistor 105 and power supply 112 to ground and a cathode 128. Resistor 105 is adjusted to bias thyratron 122 to fire upon receipt of a positive pulse. A plate 127 of a thyratron 122 connects to a solenoid 118 through contacts 116 and 117 to the positive side of power supply 119. The solenoid 118 is arranged to open normally closed contacts 116 and 117 when energized.

The grid 125 of thyratron 122 is pulsed through a condenser 121 at the instant of any rise in its photocell path current caused when all the switches 51, 52, 53, or 54 are opened that have been closed, or when switch 55 is closed while all of the switches 51, 52, 53, and 54 are open. When thyratron 122 is fired, solenoid 118 is energized and contact points 117 and 116 are broken;

this breaks supply 119 to all thyratrons and resets the thyratron 122 and all the thyratrons 107. The thyratron 122 will not again refire until it receives another positive pulse. Thus all fired thyratrons 107 will remain fired and all registered numerals on plate 50 remain illuminated until the last switch 51, 52, 53, or 54, that has been closed, is opened, then all the thyratrons will reset.

It is apparent that the photoelectric cells on the surface 45 and the circuit thereof may be used for converting binary signals to decimal or to other notations of values in conjunction with commonly used devices having binary coded output without the use of the switches and relays as shown. Output lines from devices having a binary output may be made to directly control light sources so as to function in the manner hereinbefore described for key register 40 and lights 41A through 44B.

The output of the photoelectric cell surface 45 also is not restricted to the thyratron-controlled visual display as hereinbefore described. It is obvious that the output from the photoelectric cells shown leading to thyratrons 107 and 122 may be applied directly, or together with commonly known amplifying devices, to operate numerous types of electrical display and switching apparatus, such as, punches and printers.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A register comprising a plurality of units each having two light responsive electrically conductive paths, electrical circuits each containing a path of a plurality of said units, selecting means for activating said light responsive paths to complete a circuit according to a predetermined binary entry, said selecting means having light source means controlled by said entry for alternatively illuminating one or the other of said paths for each of said units, and display means actuated by an energized circuit to indicate a value on said register equivalent to said binary entry.

2. A register device comprising a settable entry means, a plurality of units each having two photosensitive paths, a plurality of circuits each including one of the two paths of a plurality of said units, registering means for each said circuit effective when said paths within said circuit are exposed to light, and a light source controlled by said entry means to selectively illuminate said paths whereby a value is registered on said register means corresponding to the setting of said entry means.

3. A register device comprising a settable binary entry means, a plurality of units each having two photosensitive paths, a plurality of circuits each including one of the two paths of a plurality of said units, registering means for each said circuit effective when said paths within said circuit are exposed to light, and a light source controlled by said entry means to selectively illuminate said paths whereby a value is registered on said register means corresponding to the setting of said binary entry means.

4. A data register device comprising a means for entry of a binary amount, a light source controlled by said entry means, a plurality of units each having two photosensitive paths selectively controlled by said light source, and a means for registering a plurality of values, a circuit including a path of a plurality of said units to effect a registration whereby a decimal value is displayed on said register means equivalent to the amount entered into said entry means.

5. A digit display register comprising a plurality of photoelectric units, each said unit having two conductive paths, means for each said unit for illuminating one of said paths, a plurality of electrical circuits each including a conducting path of a plurality of said units, and means to enter amounts for controlling the said illuminating means to illuminate said paths corresponding to a values equivalent of the said amounts.

6. A register comprising a plurality of photoelectric units, each said unit having two conductive paths, means for selectively illuminating said paths, a plurality of electrical circuits each including a conductive path of a plurality of said units, each said circuit corresponding to a predetermined decimal value, means for entering a binary amount for controlling the said illuminating means to select one of said circuits corresponding to a decimal value equivalent of the said amount, and means under control of each said circuit for registering said value.

7. A digit display register comprising a plurality of photoelectric units, each said unit having two light responsive conductive paths, display means for indicating the registration of a decimal notation, means for establishing an electrical circuit to the said display means including a path of a plurality of said units, means for selecting one or the other of said paths in said units according to a predetermined binary notation, and electron discharge devices under control of said circuits for actuating said display means to register values corresponding to the said binary notation.

8. A register comprising a plurality of units each having two light responsive electrically conductive paths, electrical circuits each containing a path of a plurality of said units, means for selectively activating said circuits according to predetermined binary entries, said activating means including light sources for illuminating said paths, and a display means responsive to an activated circuit to indicate a value on said register equivalent to a selected binary entry.

9. A register comprising a plurality of devices for indicating notations of value, each said device controlled by one of a plurality of output lines, a plurality of units having two electrically conductive light responsive paths extending from a common junction, a first electrical circuit connecting each path of a first group of said paths to a said junction of another said unit, a second electrical circuit connecting each path of a second group of said paths to one of said output lines, a means for selectively illuminating one or the other of said paths of each said unit according to a predetermined binary entry amount whereby a said output line is energized to control one of said devices to indicate a notation on said register of a value equivalent to said binary entry amount.

No references cited.